United States Patent [19]
van der Lely

[11] 4,121,680
[45] Oct. 24, 1978

[54] VEHICLES

[76] Inventor: Cornelis van der Lely, 7 Brüschenrain, Zug, Switzerland

[21] Appl. No.: 741,950

[22] Filed: Nov. 15, 1976

Related U.S. Application Data

[63] Continuation of Ser. No. 540,824, Jan. 14, 1975, abandoned.

[30] Foreign Application Priority Data

Jan. 15, 1974 [NL] Netherlands ............. 7400508

[51] Int. Cl.² ............................................. B62D 61/10
[52] U.S. Cl. .................................... 180/24; 180/1 F;
180/12; 180/24.01; 180/53 C; 180/53 D;
280/456 A; 280/81.5
[58] Field of Search ............ 280/400, 408, 456 A,
280/456 R, 460 A, 460 R, 461 A, 461 R, 476 A,
476 R, 492, 494, 239, 81.5; 180/1 F, 11, 12, 13,
14 R, 22, 23, 24, 24.01, 53 C, 53 D, 54, 2, 89.1

[56] References Cited

U.S. PATENT DOCUMENTS

| | | | |
|---|---|---|---|
| 1,785,124 | 12/1930 | Jett ..................................... | 280/492 |
| 2,370,866 | 3/1945 | Lewis ........................... | 240/460 R X |
| 2,482,976 | 9/1949 | Harwood ........................ | 180/14 R |
| 2,527,343 | 10/1950 | Wilson ........................... | 280/456 A |
| 2,529,159 | 11/1950 | Hyler .............................. | 180/14 R |
| 2,544,521 | 3/1951 | Bergen ........................... | 180/1 F X |
| 2,763,331 | 9/1956 | LeTourneau ..................... | 180/45 |
| 3,086,618 | 4/1963 | Christiansen .................... | 280/400 X |
| 3,105,705 | 10/1973 | Richard .......................... | 280/461 R |
| 3,170,715 | 2/1965 | Johnson .......................... | 180/14 X |
| 3,183,991 | 5/1965 | Gamaunt ......................... | 180/24 |
| 3,185,324 | 5/1965 | Breithaupt ....................... | 180/24 X |
| 3,294,418 | 12/1966 | Middlesworth ................... | 280/408 |
| 3,351,037 | 11/1967 | Meili ............................... | 180/24 X |
| 3,353,618 | 11/1967 | Fisher ............................. | 180/14 R |
| 3,446,175 | 5/1969 | Boehler ........................... | 180/12 |
| 3,630,302 | 12/1971 | Holland .......................... | 180/12 |
| 3,899,039 | 8/1975 | McHugh .......................... | 180/11 |
| 3,921,742 | 11/1975 | May ................................ | 180/64 R X |

FOREIGN PATENT DOCUMENTS

| | | | |
|---|---|---|---|
| 166,982 | 3/1950 | Austria ........................... | 280/492 |
| 1,058,867 | 3/1954 | France ............................ | 180/14 R |
| 618,649 | 3/1961 | Italy ............................... | 180/14 R |

Primary Examiner—John P. Silverstrim
Attorney, Agent, or Firm—Mason, Mason & Albright

[57] ABSTRACT

According to the present invention, there is provided a vehicle having, viewed from the side, at least three ground wheels arranged one behind the other with respect to the direction of forward travel of the vehicle, and at least one lifting device. At least one of said ground wheels is interconnected with another wheel by a freely pivotable quadrangular structure that is in front or behind said one ground wheel with respect to the direction of forward travel.

11 Claims, 18 Drawing Figures

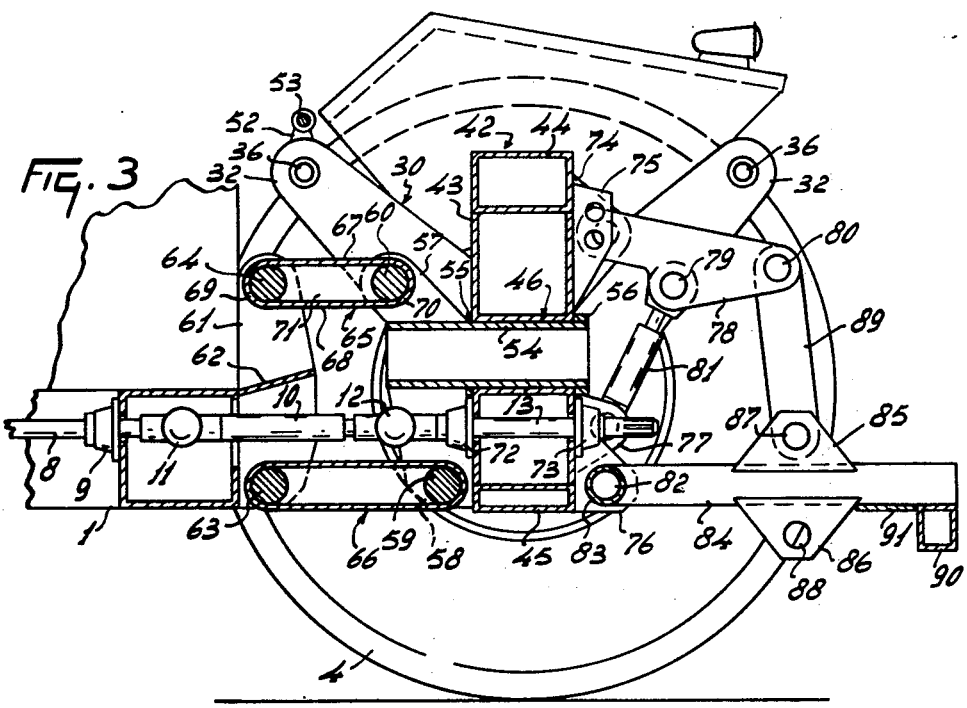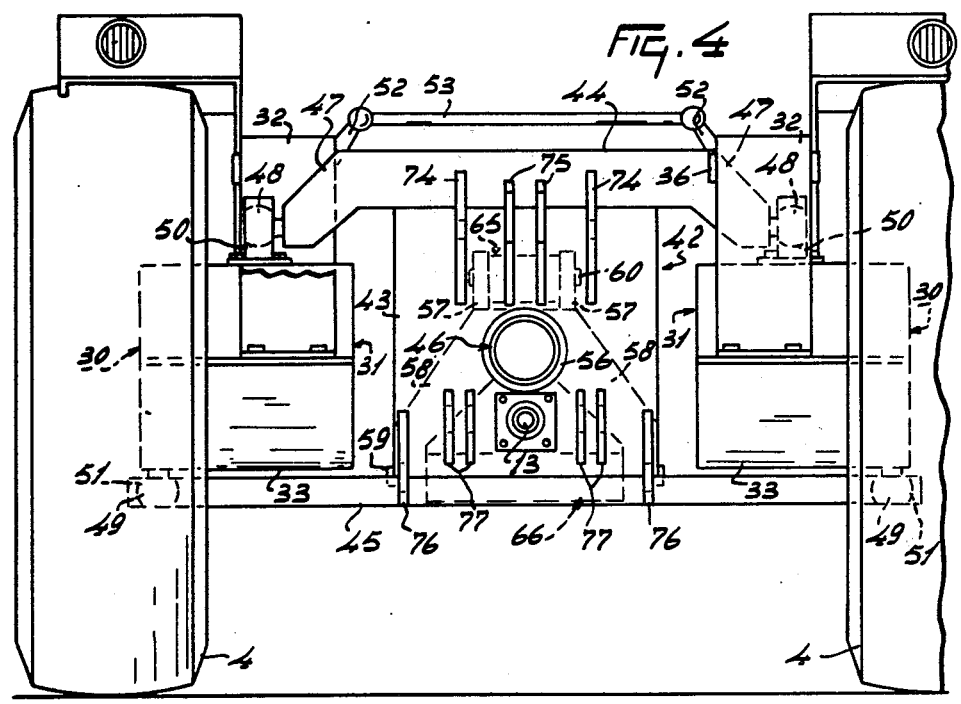

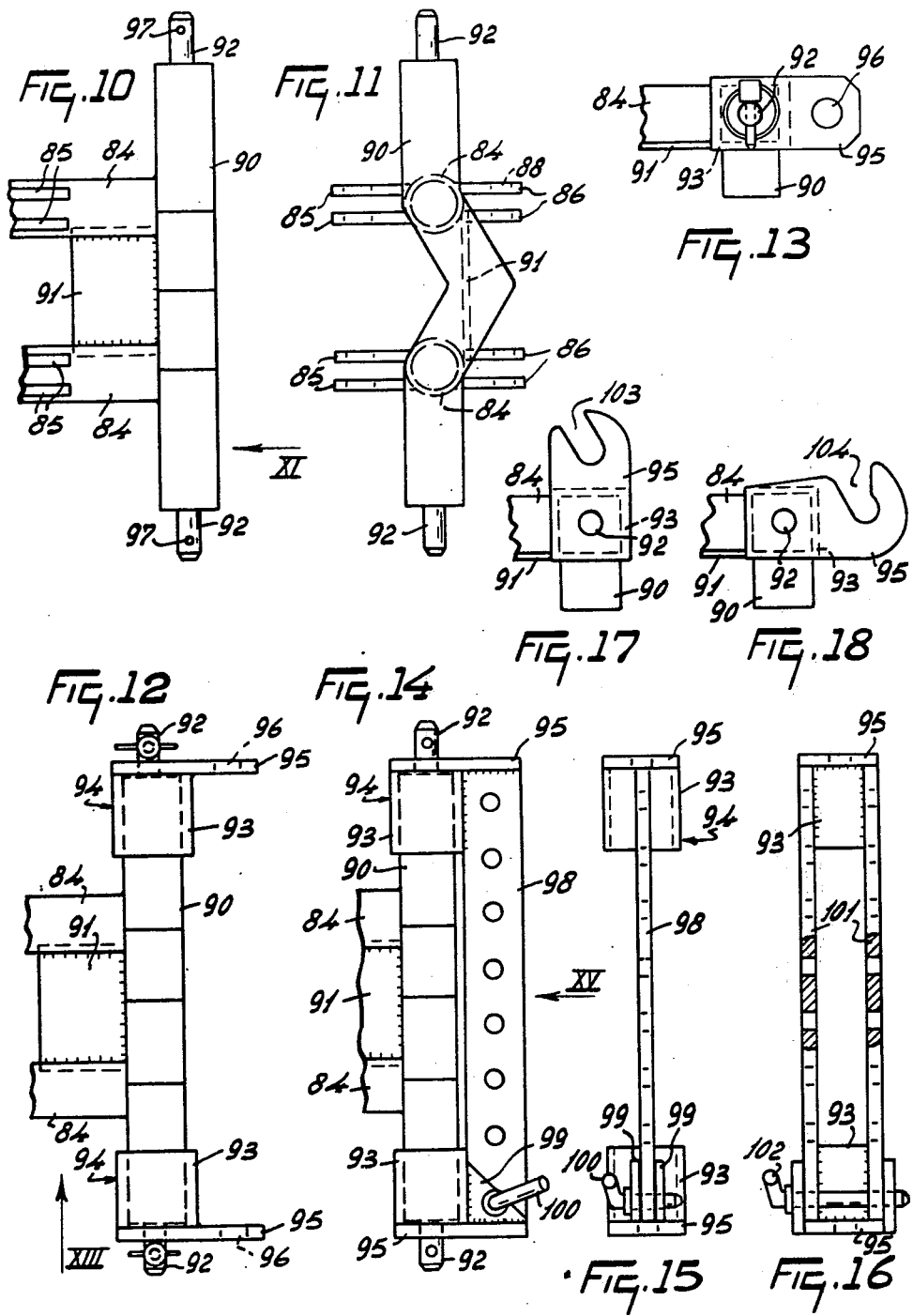

VEHICLES

RELATED APPLICATIONS

This application is a continuation of application Ser. No. 540,824 filed Jan. 14, 1975 (now abandoned), and is related to Serial No. 517,068 filed Oct. 22, 1974.

BRIEF DESCRIPTION OF THE DRAWINGS

For a better understanding of the invention and to show how the same may be carried into effect, reference will now be made, by way of example, to the accompanying drawings, in which:

FIG. 3 is a sectional view taken on the line III—III in FIG. 2 and drawn to a larger scale, FIG. 4 is a rear view of the rearmost part of the tractor, a lifting device being omitted, FIG. 10 is a plan view of the rear part of the lifting device of the tractor, FIG. 11 is a side view taken in the direction of arrow XI in FIG. 10, FIG. 12 is a plan view of the rear part of the lifting device, similar to FIG. 10 but showing the lifting device provided with coupling points, FIG. 13 is a side view taken in the direction of arrow XIII in FIG. 12, FIG. 14 is a plan view of the rear part of the lifting device, similar to FIG. 10 but showing the lifting device provided with a tool bar, FIG. 15 is a side view taken in the direction of arrow XV in FIG. 14, FIG. 16 is a side view similar to FIG. 15 but of a second embodiment showing an alternative form, FIG. 17 is a side view showing a first form of a hook gripper coupled with the lifting device, and FIG. 18 is a side view showing a second form of a hook gripper coupled with the lifting device.

DESCRIPTION OF THE PREFERRED EMBODIMENTS

Figure 1:
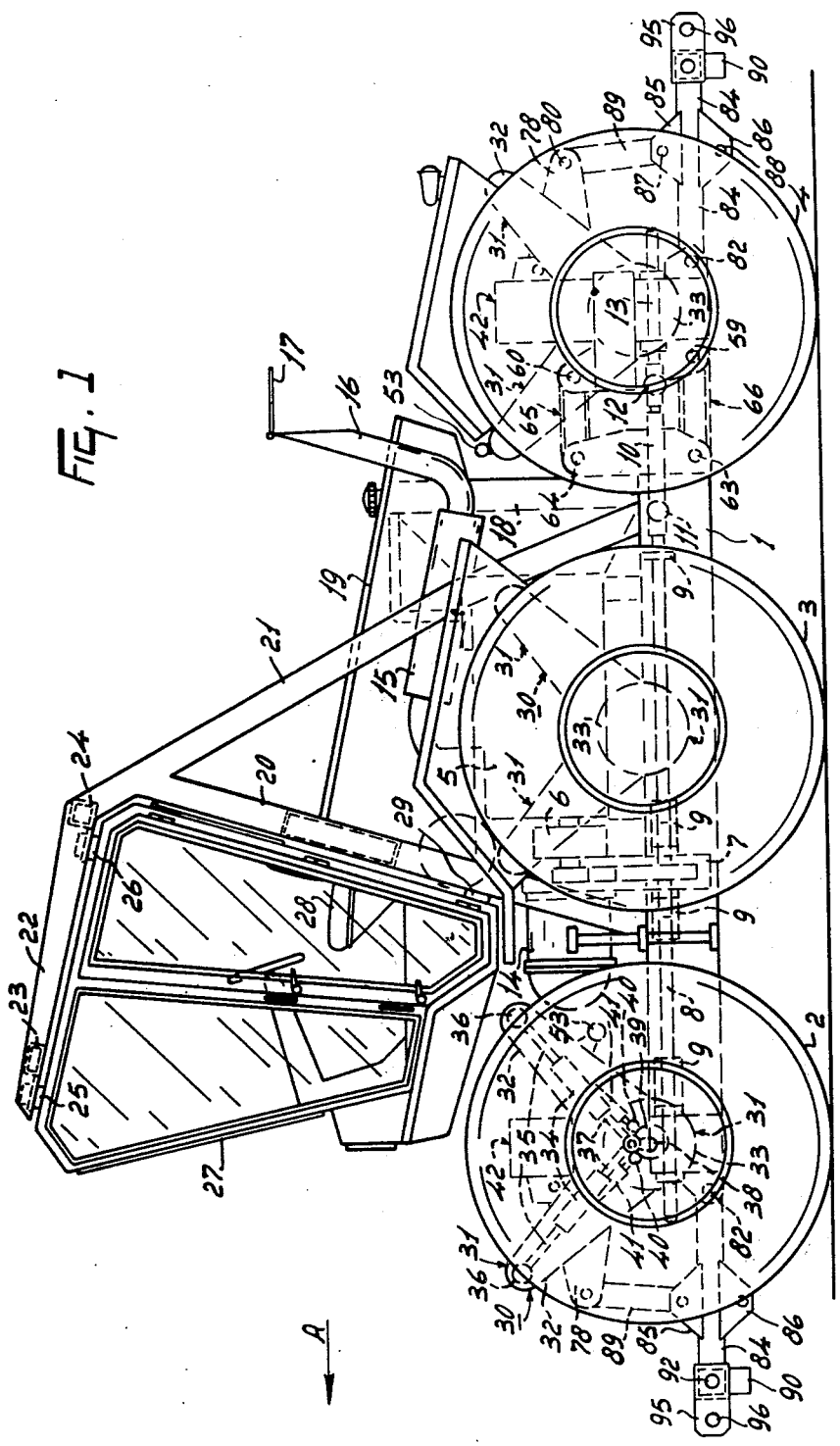
FIG. 1 is a side view of a tractor in accordance with the invention.

The tractor of the Figures has a frame 1 made up of rectangle-section hollow steel beam parts extending uninterruptedly, viewed on plan, substantially along the sides of a rectangle but deviating near the corners of the rectangle from the rectangular form so that near these corners the rectangle is bevelled to accommodate steering movement (to be described hereinafter) of the front and rear ground wheels of the tractor. The outermost boundary faces of this rectangle are located near the respective boundary faces of the inner sides of the ground wheels, there being on each side of the tractor three ground wheels arranged one behind the other so that there is one pair of front wheels 2, one pair of central wheels 3 and one pair of rear wheels 4. As just mentioned, the front wheels 2 and the rear wheels 4 are steerable. The central wheels 3 are non-steering wheels. All the wheels can be driven hydraulically. Viewed from the side, the axis of rotation of the front wheels 2 is at the level of the top surface of the frame 1 and at a short distance in front of the front end of the frame. The axis of rotation of the central wheels 3 is located at the same level and slightly behind (with respect to the direction of operative forward travel A) a point located midway along the length of the frame 1. The axis of rotation of the rear wheels 4 is located behind the rear end of the frame 1 at a distance which is approximately equal to the radius of the wheels 4. The diameters of all wheels are the same and are at least 150 cms.

On the frame 1 is mounted a driving engine 5, having a power of at least 200 HP, at a place such that, viewed from one side (FIG. 1) the engine 5 is located behind the upper half on one of the central wheels 3, that is to say with respect to the direction of forward travel A approximately midway along the length of the frame 1. With respect to the direction of forward travel A, the engine 5 has in front of it a clutch 6 for operation by a driver to couple to the engine 5 a gear box 7 for driving an approximately horizontal power take-off shaft 8/10/13 extending from the gear box 7, in the direction of forward travel A, both forwardly to a point in front of the axis of rotation of the front wheels 2 and rearwardly to a point behind the axis of rotation of the rear wheels 4. The center line of the power take-off shaft 8, 10 and 13 is located in a vertical plane of symmetry of the tractor. The foremost portion 8 of the power take-off shaft is supported from the frame 1 by bearings 9. The intermediate portion 10 is pivotally connected by means of universal couplings 11 and 12 with the foremost and rearmost portions 8 and 13 of the power take-off shaft, the rearmost portion 13 being movable with respect to the frame 1 as will be explained more fully hereinafter. If desired a plurality of power take-off shafts arranged side by side can be provided.

At a location in front of the engine 5 and the clutch 6 with respect to the direction of forward travel A, a hydraulic pump 14 is disposed that provides the desired hydraulic fluid flows for driving the ground wheels. Above the top of the engine 5 and, viewed on plan, at a location to one side of the engine 5, an exhaust system 15 is provided which terminates at the rear in an upwardly bent-over tail pipe 16 for the exhaust gases of the engine, this tail pipe 16 being provided near its free end with a substantially horizontal rain deflector 17. With respect to the direction of forward travel A, a radiator 18 stands vertically behind the engine 5 with its rearmost boundary face extending transversely of the direction of travel A and approximately coinciding with the rear of the frame 1. At a distance above the engine 5 a bonnet 19 is provided.

To each of the two long sides of the rectangular frame 1 are welded two upwardly converging strut beams or supports 20 and 21. For each of these pairs of supports 20, 21, viewed from the appropriate side, the fastening point of the foremost support 20 on the frame 1 is located between a front wheel 2 and a central wheel 3, whereas the fastening point of the rearmost support 21 on the frame 1 is located between the central wheel 3 and a rear wheel 4. Each supporting beam 20 is disposed in a substantially vertical plane and is inclined, in that plane, from the frame 1 upwardly and rearwardly.

Each supporting beam 21 is inclined from the frame 1 upwardly and forwardly and is bent near the rear of the adjacent wheel 3 in order partially to embrace the engine 5. The upper portion of each supporting beam 21 is disposed in a substantially vertical plane. Each pair of supports 20 and 21 are welded together at their top ends and a supporting beam 22 extends away from this junction inclined upwardly and forwardly. The two supporting beams 22 are interconnected near their free ends by a horizontal box-shaped fastening beam 23 extending transversely of the direction of forward travel A, and another fastening beam 24 located near the top ends of the supports 20 and 21 similarly interconnects the beams 22 at this location. The supports 20, 21 and the supporting beams 23 and 24 constitute a framework to protect the driver in the event of the tractor rolling over.

Near and beneath the fastening points of the beams 23 and 24 to the supporting beams 22 two elastic suspension members 25 and 26 are fastened to each of the supporting beams 22. These four suspension members, for example, formed essentially by rubber bodies each having two fastening bolts vulcanized-in, hold a driving cabin 27 within which there is a driving seat 28 and the required controls such as a steering wheel, brake pedal, accelerator pedal, instruments, clutch pedals, control members for the power take-off shaft 8, 10 and 13 and the lifting devices to be described hereinafter, and so on. The disposition of the supports 20 and 21, the two supporting beams 22 and the cabin 27 is such that the driving seat 28 is located above the hydraulic pump 14, at least as viewed from the side (FIG. 1). The cabin 27 is furthermore held in place with respect to the supports 20 by means of elastic, for example, rubber elements 29, mounted between the rear of the cabin 27 near the bottom thereof and the two supports 20. The vertical plane of symmetry of the cabin 27, viewed in the direction of forward travel A, coincides with the vertical plan of symmetry of the tractor. Although the driving cabin 27 is mounted near the front of the tractor, the front wall of the cabin is located at a short distance behind the foremost points of the front wheels 2. Viewed from the side, the cabin 27 and the driving seat 28 are located above the top points of the wheels 2 to 4.

Each of the wheels 2 to 4 is driven by a separate hydraulic motor 30. Each hydraulic motor 30 is surrounded by a housing 31, indicated by broken lines in FIG. 1, and having, as shown in FIG. 1, an upper portion in the form of two upwardly tapering parts 32 arranged in the shape of a V, and a lower portion 33 having a cylindrical wall which is coaxial with the rotary axia of the associated wheel, the parts 32 merging with the cylindrical surface of the portion 33. Viewed in the direction of forward travel A, the two parts 32 and the portion 33 of the housing 31 of each hydraulic motor 30 have a rectangular shape. The two parts 32 are located completely in the space between the associated wheel and the plane of symmetry of the tractor, that is to say, close to the side of the wheel, whereas the portion 33 is partly located in this space and partly in a space enclosed by the felly of the associated wheel. This is illustrated in FIG. 4, which shows the housings 31 of the motors associated with the wheels 4. The disposition and the shape of all the hydraulic motors 30 and their locations relative to the associated wheels are identical.

The hydraulic motors themselves are also identical. The operation of each such motor will be described with reference to FIG. 1, which shows by broken lines the component parts of the motor 30 associated with one wheel 2. Each of the V-shaped parts 32 of the housing 31 contains a hydraulic cylinder 34. This cylinder itself is pivoted by means of a rod 35 rigidly secured to the cylinder and connected, at its end remote from the center of the wheel 2, to a horizontal pivotal shaft 36 extending transversely of the direction of travel A and supported from the part 32 of the housing 31. The plungers 37 of the two hydraulic cylinders 34 are journalled side by side in bearings at their free ends near the free end of a crank 38, the bearings being on the end of this crank. The crank 38 has a stub shaft the center line of which coincides with the rotary axis of the wheel 2. The free ends of the plungers 37 are journalled at the end of the part of the crank 38 remote from the stub shaft, which part is located displaced from the center line of the stub shaft. The center line of the stub shaft part is surrounded by a control-disc 39 having a circumference which generally deviates from a circle. Along the circumference of the control-disc 39 rollers 40 are adapted to move, these rollers being arranged at the ends of the rods of steering slides 41. Each of the steering slides 41 is associated with one of the hydraulic cylinders 34 and is arranged approximately parallel to and at the side of this cylinder. The hydraulic motor 30 communicates through fluid ducts with the hydraulic pump 14 for inlet and outlet of hydraulic fluid.

Referring to FIGS. 3 and 4, the suspension and fastening of the rear wheels 4 to the tractor is as follows. The two rear wheels 4 are interconnected by means of a wheel carrier 42 having a central housing 43, an upper supporting beam 44 welded to the top surface of the housing 43 and having the same dimensions as the corresponding dimension of the housing 43 viewed in the direction of travel A, and a lower supporting beam 45 welded to the bottom surface of the housing 43. The central housing 43 has the shape of a parallelepiped, and it is hollow and made of sheet material. As viewed from the rear (FIG. 4) the housing 43 has approximately a square shape and as can be seen from the sectional view of FIG. 3 the dimension of the housing 43 in the direction of travel A is about 35 to 40% of the dimension of the housing in the direction transverse of the direction of travel A. As can be seen in the rear view of FIG. 4, a cylindrical space defined by a tube 46 is provided coaxially with the point of intersection of the diagonals of the circumference of the housing 43, the center line of this tube 46 being horizontal and extending in the direction of travel A (see FIG. 3). The space inside the tube 46 establishes an open communication between the front and rear faces of the central housing 43. As viewed from the rear (FIG. 4), the overall width of the central housing 43 is approximately half the distance between the inside vertical boundary faces of the wheels 4.

The upper supporting beam 44 is symmetrical to the vertical plane of symmetry of the housing 43 in the direction of travel A. It has the shape of an elongated beam and is also made from sheet material and therefore hollow. The supporting beam 44 terminates at each of its two free ends in a downwardly bent-over portion 47, the end of which is located near the inner side of the adjacent wheel. The two free ends of the downwardly bent-over portions 47 are provided with laterially projecting, part-spherical hinge parts 48. The line of connection between the centers of the hinge parts 48 is horizontal and transverse of the direction of travel A and the distance between these centers is approximately twice the width of the housing 43 as viewed from the rear and amounts to 80 to 85% of the distance between the vertical boundary faces of the inner sides of the two wheels 4.

The lower supporting beam 45 fastened to the bottom of the housing 43 is also hollow and made from sheet material and the dimension of the beam 45, measured in the direction of travel A, is also equal to the dimension of the housing 43 measured in the same direction. The vertical dimension of the supporting beam 45 is about half that of the supporting beam 44. The supporting beam 45 is a straight beam and, viewed from behind, is symmetrical about the vertical plane passing through the center line of the tube 46 in the direction of travel A, which plane is also the vertical plane of symmetry of the tractor. The two free ends of the beam 45 are provided with hinge parts 49 formed by part-spherical cavities. The distance between the centers of the hinge parts 49 is approximately three times the width of the housing 43, measured as viewed from the rear, and this distance is about 1.15-times the distance between the vertical inner boundary faces of the wheels 4. The centers of the two upper hinge parts 48 and those of the two lower hinge parts 49 are located in the same vertical plane extending transverse of the direction of travel A. As viewed from the rear (FIG. 4) the angle between the line of connection between the centers of the hinge parts 48 and 49 located on one side of the vertical plane of symmetry of the tractor and the vertical plane of symmetry of the tractor is about 20°.

Each upper hinge part 48 is one part of a ball and socket joint that is completed by a complementary hinge part 50 which intimately surrounds the part 48 and is rigidly secured to the top of the part 33 of the housing 31 of the adjacent hydraulic motor 30, that is to say, at a place located, viewed from the side, between the two V-shaped, upwardly projecting parts 32 of the housing 31. Viewed from behind, the hinge part 50 is located approximately midway along the top of the portion 33 of the motor 30 and the inner side of the wheel 4.

Each lower hinge part 49 is also one part of a ball-and-socket joint that is completed by a complementary part-spherical hinge part 51 which is received in the part 49 and is rigidly secured to the bottom of the portion 33 of the housing 31 of the adjacent motor 30, that is to say at a place located near the outer end face of the portion 33 and, viewed from the side, near the lowermost point of the housing 33. Viewed from behind, the two hinge parts 49 and 51 are arranged in the cavity of the wheel 4 formed by the felly of this wheel.

From FIG. 4 it will be apparent that each wheel 4 together with the hydraulic motor driving it, that is to say, including the portions 32 and 33 of the housing 31 of the motor 30 is adapted to turn as a single unit with respect to the rigid assembly of the beams 44 and 45 and the central housing 43 about a line of connection between the centers of the ball-and-socket joints 48 and 50 and 49 and 51 respectively.

With respect to the direction of travel A, an extension arm 52 is secured at a distance in front of each assembly 43, 44 and 45 to the front part 32 of the housing 31 of each of the hydraulic motors 30. The ends of the extension arms 52 remote from the adjacent parts 32 are interconnected by a control rod 53 with the aid of ball-and-socket joints, the rod 53 extending horizontally and transversely of the direction of travel A. The control rod 53 is connected in a manner not shown with the steering equipment of the tractor and is hydraulically actuated.

Through the opening in the central housing 43 formed by the interior of the tube 46 is passed a supporting tube 54 which projects, with respect to the direction of travel A, in front of the central housing 43 out of the foremost vertical transverse face of the central housing 43 over a distance equal to the dimension of the housing 43 measured in the direction of travel A. To the rear of the central housing 43 the tube 54 projects over a comparatively small distance. The supporting tube 54 is rotatable with a close fit in the tube 46 around the coinciding center lines of the two tubes, which center lines are horizontal and extend in the direction of travel A. The supporting tube 54 is secured against axial displacement relative to the central housing 43 by means of a fixing member 55 at the front of the housing 43 and a fixing member 56 on the rear thereof, these fixing members being formed, for example, by rings rigidly secured to the tube 54 and intimately engaging the front and rear respectively of the central housing 43. With respect to the portion of the tube 54 projecting out of the front of the central housing 43 two sheet-like supporting parts 57 extend upwardly and parallel to the vertical plane of symmetry of the tractor so as to be symmetrical with respect to this plane. The supports 57 are located, viewed from the side, above the top of the supporting tube 54 and, with respect to the direction of travel A, they are inclined forwardly and upwardly.

The supports 57 are each secured to the top of a holder 58 which is directly welded to the supporting tube 54 which is inclined downwardly and outwardly, as viewed from the rear (FIG. 4) from the support 57 and the supporting tube 54. In this view the holder 58 extends approximately to near the bottom of the lower supporting beam 45. The two holders 58, forming an inverted V as viewed from the rear (FIG. 4), are provided near their lower free ends with bores having center lines which coincide. Through these two bores is passed a pin 59 which is rigidly secured to the two holders 58 and has a center line which is horizontal and transverse of the direction of travel A. The distance between the free ends of the holders 58 near the bores receiving the pin 59 is approximately equal to the width of the housing 43 as viewed from the rear. The two supports 57 also have near their free ends bores registering with one another and receiving a pin 60, which has a center line parallel to that of the pin 59. The distance between the bores in the supports 57 and hence the length of the pin 60 is approximately equal to 40% of the distance between the bores in the holders 58 or the length of the pin 59. The two holders 58 are directly welded to the tube 54 and are integral with the supports 57. Viewed from the side (FIG. 3) and with respect to the direction of travel A, the center line of the pin 59 is located behind that of the pin 60.

On the rear of the frame 1, on either side of the vertical plane of symmetry of the tractor and at equal distances from said plane, two supporting plates 61 (FIG. 3) are secured by welding and interconnected, in order to enhance their rigidity, by a screening plate 62 which is inclined rearwardly and upwardly with respect to the top and rear of the frame 1. The distance between the two parallel supporting plates 61 is equal to the distance between the lower free ends of the holders 58. Near their lower ends the supporting plates 61 have bores, the center lines of which are in line with one another, through which bores is passed a pin 63 having a center line which is horizontal and transverse of the direction of travel A. The top ends of the supporting plates 61 also have bores with center lines which coincide and through which a pin 64 is passed, the center line of which is horizontal and transverse of the direction of travel. Viewed from the side (see the sectional view of FIG. 3) the relatively parallel center lines of the pins 63 and 64 are located in the same vertical plane transverse of the direction of travel A.

The pins 60 and 64 are interconnected by an upper coupling element 65. The pins 59 and 63 are interconnected by a lower coupling element 66. The coupling element 65 is pivotable with respect to the pins 60 and 64, which are rigidly secured with respect to the support 57 and the frame 1 respectively. The lower coupling element 66 is pivotable with respect to the pins 59 and 63, which are rigidly secured with respect to the holders 58. Each of the upper and lower coupling elements 65 and 66 is formed by a flat-box-shaped, torsion-resistant structure having a sheet-like top wall 67 and a sheet-like bottom wall 68, interconnected at the front and the rear by a front wall 69 and a rear wall 70, the latter two being semi-cylindrical. The front wall 69 intimately engages the front of the pin 64 (or 63), whereas the rear wall 70 intimately engages the rear half of the cylindrical surface of the pin 60 (or 59). The walls 67 and 68 are interconnected by vertical sidewalls of which the sidewall 71 is shown in the sectional view of FIG. 3. Each of the sidewalls is sharply bent, viewed on plan (see FIG. 2) since the length of the pin 64 (or 63) exceeds that of the pin 60 (or 59) and the sidewalls 71 engage the inner sides of the supports 57 and the inner sides of the supporting plates 61. The walls 67 to 70 are located, viewed on plan or from the rear, between the two sidewalls and are welded thereto. The sidewalls have round holes near the fromt wall 69 and the rear wall 70 for receiving the pins 60 and 64. The front wall 69 and the rear wall 70 prevent the pins 60 and 64 from moving away from one another and the two sidewalls 71 of the upper coupling element 65 prevent the pins 60 and 64 from approaching one another. The construction of the lower coupling element 66 is similar to the construction of the coupling element 65 described above. The center lines of the pins 59, 60, 63 and 64 are parallel to one another and viewed from the side (see FIG. 3) they are at the corners of a guadrangle. This guadrangle may be a parallelogram, but in the embodiment shown in FIG. 3 it is trapezoidal at least in the position of the tractor shown in FIG. 3. The distance between the center lines of the pins 60 and 64 is in this embodiment more than 70% of the distance between the center lines of the pins 59 and 63.

FIG. 3 shows the bearing 9 supporting the power take-off shaft portion 8 on the frame 1 and bearings 72 and 73 supporting the rear portion 13 of the power take-off shaft on the central housing 43. The universal couplings 11 and 12 are arranged between the frame 1 and the central housing 43, which is movable with respect to frame 1, as well as the telescopically extensible portion 10 of the power take-off shaft.

Figure 2:
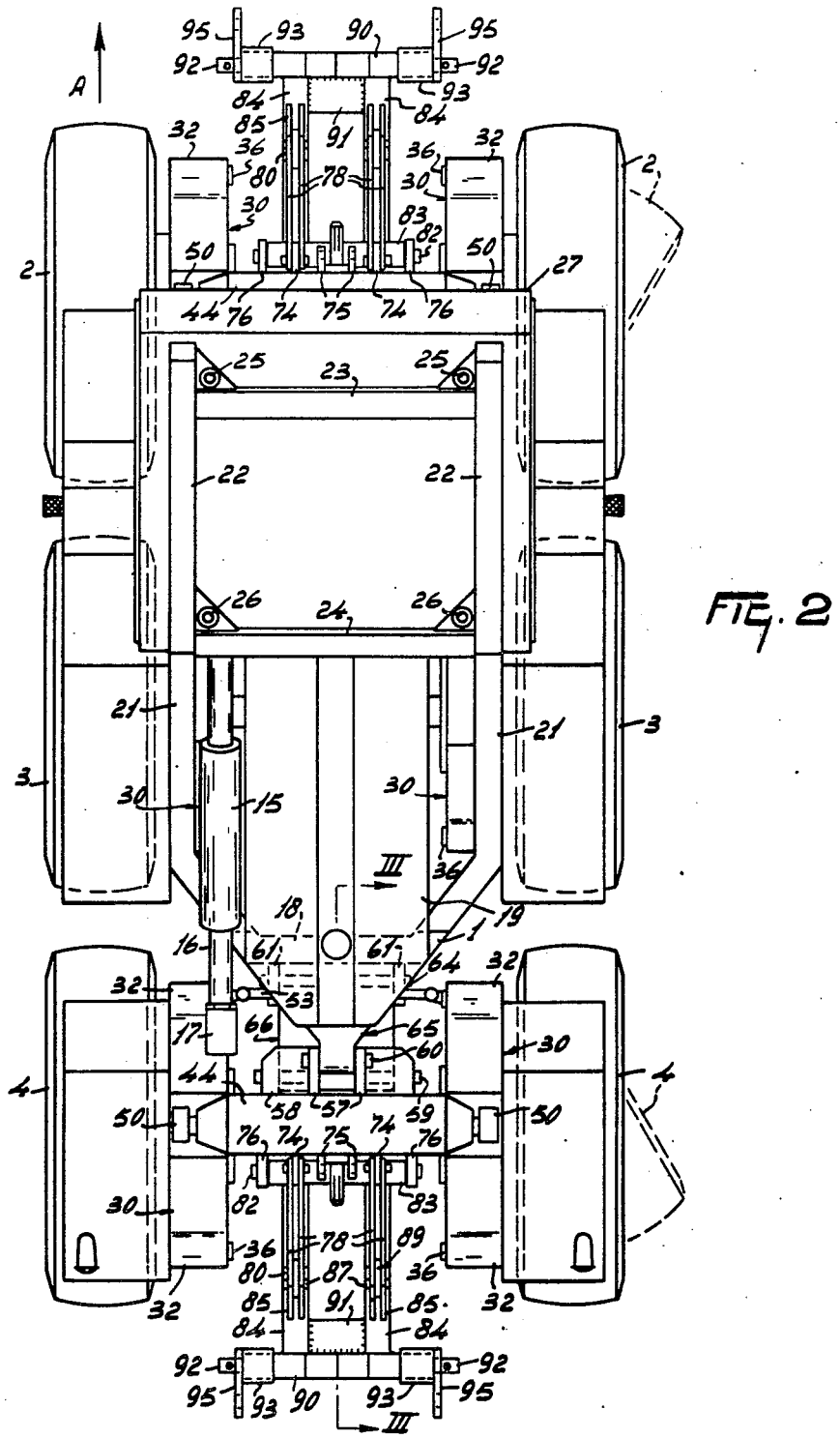
FIG. 2 is a plan view of the tractor.

The rear of the central housing 43 and the upper supporting beam 44 have welded to them two parallel ears 74 one on each side of and at equal distances from the vertical plane of symmetry of the tractor, the distance between these ears 74 being approximately equal to the length of the pin 60. Between the ears 74, on the same side of the central housing 43, two ears 75 are welded for fastening a pivotable top rod (not shown) associated with the lifting device of the tractor provided at the rear end described more fully hereinafter. The distance between the ears 75, arranged symmetrically with respect to the vertical plane of symmetry of the tractor, is approximately one quarter of the distance between the ears 74 (FIGS. 2, 3 and 4). Near the lower faces of the central housing 43 and of the lower supporting beam 45 two ears 76 are welded symmetrically with respect to the vertical plane of symmetry of the tractor, the distance between them being approximately equal to the width of the central housing 43, viewed from the rear. On each side of the area where the rearmost portion 13 of the power take-off shaft leaves the rear of the central housing 43 a pair of identical ears 77 are provided, the two pairs being spaced apart by a small distance, which is smaller than the distance between the ears 76, each pair of ears 77 located on each side of the plane of symmetry of the tractor being disposed so that the vertical plane of symmetry between each pair of ears 77 coincides with the vertical plane of symmetry of the superjacent ear 74. On each side of each ear 74 an arm of a pair of arms 78 is pivoted to the ear 74 and extends away from the ear 74 to the rear (FIG. 3). Each of these arms is provided midway along its length with a horizontal pivotal shaft 79 extending transversely of the direction of travel A, and a pivotal shaft 80 so parallel to the shaft 79 and journalled near the rearmost free end of each of the arms 78. The arms 78 located one on each side of each ear 74 are parallel to one another and lie in a vertical plane.

The pivotal shaft 79 is engaged with a piston rod of a hydraulic cylinder 81, the end of which rod is located between the two arms 78. The hydraulic cylinder 81 is located between two corresponding ears 77, with respect to which it is pivotable about a horizontal pivotal axis extending transversely of the direction of travel A, there being such a cylinder 81 between each pair of ears 77. Through bores in the ears 76, the center lines of which are in line with one another and extend horizontally and transversely of the direction of travel A, is passed a pin 82 which between the ears 76 is disposed within a tube 83 which rotates about the pin 82. The tube 83 has welded to it two hollow tubular lower lifting arms 84 forming part of the rear lift of the tractor. The two lower lifting arms 84 extend away from the tube 83 to the rear. Each of the lower lifting arms 84 is provided with, in total, four triangular fastening tags. Two of these fastening tags 85 are fastened to one face, in this case the top face, of the corresponding lower lifting arm 84 and have identical shapes being at a short distance from and parallel to one another. The other two fastening tags 86 extend downwards from the lifting arms 84. The two tags 85 and the two tags 86 have bores for receiving a pivotal shaft 87. In the arrangement illustrated in FIG. 3 this shaft 87 is journalled only in the fastening tags 85, the bores 88 in the fastening tags 86 being inoperative. The other lifting arm 84 is provided in a similar manner with fastening tags 85 and 86. Between each pivotal shaft 80 and the corresponding pivotal shaft 87 a rod 89 extends, having its ends between the arms 78 and the fastening tags 85. In the nonlifted position of FIG. 3 this rod 89 is approximately vertical.

As indicated above, the fronts of the two lifting arms 84 are rigidly secured to one another by means of the tube 83. The rears of the lower lifting arms 84 are rigidly secured to one another by means of a hollow square sectional lifting beam 90 shows best in FIGS. 10 to 12.

The lifting beam 90 is substantially horizontal and extends transverse of the direction of travel A, and is symmetrical with respect to the vertical plane of symmetry of the tractor in the direction of travel A and it is furthermore symmetrical with respect to the two lifting arms 84, which are mirror-images with respect to the vertical longitudinal plane of symmetry of the tractor. The lifting arms 84 are interconnected on their lower faces (FIG. 3) by a connecting plate 91 located in front of the lifting beam 90, with respect to the direction of travel A, the plate 91 being also welded to the lifting beam 90 so that is enhances the shear resistance of the assembly formed by the tube 83, the arms 84 and the beam 90. The plate 91 is parallel to the parallel center lines of the two lower lifting arms 84. The two ends of the lifting beam 90 have registering center lines which intersect the center lines of the two beams 84, as will be appreciated from FIG. 11. To the two ends of the beam 90 are fastened cylindrical pins 92, the center lines of which coincide with the prolongation of the center line of the adjacent portion of the beam 90 and which are horizontal and transverse of the direction of travel A. The shape of the lifting beam 90 is such that the portion located between the prolongations of the center lines of the arms 84 is bent outwardly to one side out of the prolongations of the center lines of the outer portions of the beam 90 and of the pins 92. This bend is directed so that the center line of the overall lifting beam 90 is parallel to a vertical plane transverse of the direction of travel A. This bend between the lifting arms 84, as shown in FIG. 11, has the shape of a V which is symmetrical with respect to the vertical plane of symmetry of the tractor. The two central bending points, see FIG. 11 of the circumference of the V-shaped portion are both located on one side of the line of connection between the center lines of the arms 84 in this view. The plate 91 is eccentric to this line of connection and is welded along the front edge of this V-shaped portion.

In the form shown in FIG. 12 the boundary faces of the two ends of the lifting beam 90, which define a square, are surrounded by correspondingly square sleeves 93 open on one side and fitting around the ends of the beam 90, with respect to which they cannot turn. The sleeves 93 form parts of tool mounts 94 which can be slipped onto the lifting arms when a particular type of tool has to be attached. The outer face of each sleeve 93 is closed by a welded plate 95 which is vertical in the mounted state and parallel to the longitudinal plane of symmetry of the tractor, the plate 95 having a hole permitting the tool mount 94 to be slipped onto the pin 92, and furthermore having a bore 96 in a portion of the plate 95 projecting from the sleeve 93. (FIG. 13.) Through a bore 97 in each of the pins 92 can be passed a locking member to prevent the tool mounts 94 from undesirably slipping off the lifting beam 90.

In the further form shown in FIG. 14 one only of two tool mounts 94 is provided with an elongated welded tool bar 98, having a row of holes, which is secured to this tool mount so that the longitudinal axis of the tool bar 98 is at right angles to a plane to which the plate 95 is parallel. The tool bar 98 is welded in the corner between the sleeve 94 and the plate 95. The length of the tool bar 98 is such that it just fits in between the plate 95 to which it is welded and the corresponding plate 95 of the other tool mount 94 when the sleeves 93 are in place on the lifting beam 90. The tool mount 94 to which the tool bar 98 is not welded is provided at the corner between the sleeve 93 and the portion of the plate 95 projecting behind this sleeve with a pair of superjacent, triangular locking plates 99, the distance between which is such that the tool bar 98 associated with the other tool mount 94 just fits in between. Each of the two locking plates 99 has a hole registering with the hole in the other, the center lines of these holes being parallel to a plane to which the associated platee 95 is parallel. Through this pair of holes and through a hole near the end of the tool bar 98 a locking pin 100 can be passed, which locks in place the two tool mounts to one another and to the lifting arms 84, (FIGS. 14, 15).

In the form shown in FIG. 16 two plates 101 are arranged one above the other in the corner between the sleeve 93 and the plate 95 of one of two tool mounts 94, these plates having each a row of holes, the holes registering with one another. The ends of the two plates 101 remote from the associated plates 95 can be connected in a similar manner with the associated tool mount 94 by means of a locking pin 102, which is passed through two bores in two superjacent locking plates (corresponding with the locking plates 99) and through corresponding bores in the two plates 101.

In the form shown in FIGS. 12 and 13 the coupling members formed by the plates 95 extend to the rear away from the sleeves 93. The usability may be enhanced by arranging two or more plates 95 side by side, viewed in the direction of the center line of of sleeve 93, while a second plate is turned through 90° with respect to the plate 95 shown and/or by arranging a plate turned in upward direction through 45° with respect to the plate shown or by arranging a plate turned through 160° with respect to the plate shown. The holes 96 in the plates may hold ball bearings.

FIGS. 17 and 18 show two forms of a differently shaped tool mount, in which the plate 95 is formed as a hook gripper having an elongated hole 103 (FIG. 17) or 104 (FIG. 18) instead of a bore 96. The sleeve 93 is slipped onto one end of the lifting beam 90 so that the plate 95 extends upwardly (FIG. 17) or rearwardly (FIG. 18), so that in the case of FIG. 17 the elongated hole 103 is inclined towards its opening at the circumference of the plate 95 upwards in forward direction with respect to the direction of travel A of the tractor. In the form of FIG. 18 the sleeve 93 is displaced through about 90° to the right relatively to the disposition of FIG. 17, and the elongated hole 104 is inclined upwardly and forwardly towards its opening at the circumference of the plate 95.

It should be noted that the rear lifting device of the tractor described above may be arranged in a similar manner at the front of the tractor, or both front and rear lifting devices can be provided, as in the tractor illustrated.

The tractor operates as follows. The driving engine 5, the power of which amounts preferbly to more than 200 HP, drives the hydraulic pump 14 which provides the pressurized fluid for driving the six hydraulic motors 30. The hydraulic fluid fed to the double-acting, hydraulic cylinders 34 (see the motor 30 and associated wheel 2 ) causes each plunger 37 to reciprocate with respect to its associated pivotal shaft 36 and this motion causes the cranks 38 to turn and hence also the ground wheels 4. This crank driving mechanism, and particularly the speed of movement of each plunger 37 relative to the associated hydraulic cylinder, is controlled by means of the steering slides 41, each of which is governed by the associated roller 40 travelling along the circumference of its control-disc 39. The shape of the circumference of the control disc 39 is such that the hydraulic fluid fed via the steering slide 41 to the associated hydraulic cylinder 34 is fed in such quantities per unit time that the rotary speed of the crank is uniform so that the associated road wheel rotates with a uniform angular speed. The reactive force of this wheel drive is absorbed by the two pivotal shafts 36 of the cylinders and hence by the parts 32 of the housing 31. So far as the drive of the front wheels 2 and the central wheels 3 is concerned, these forces are transferred directly from the housing 31 to the frame 1, whereas with the rear wheels 4 these forces are passed through the ball bearings 48, 50 and 49, 51 respectively via the central housing 43, the supporting tube 54 and the coupling elements 65 and 66 to the frame 1. The wheels 2 and 4 are steered through the housings of the associated, identical hydraulic motors 30 by means of a hydraulic mechanism (not shown) serving to displace the control rod 53 (FIG. 4), in which case the steering force exerted directly on the foremost housing part 32 of each such hydraulic motor 30 associated with the rear wheels 4 acts at a distance from the line of connection between the ball bearings 48, 50 and 49, 51 respectively so that the wheels will turn about this line of connection. The steering of the front wheels 2 is performed in a similar manner.

Through the clutch 6 and the gear wheels of the gear box 7 the engine 5 drives the power take-off shaft 8 at a speed determined by the transmission ratio of the gear wheels. At the front, and at the rear, of the tractor a tool can be attached to the power take-off shaft portion 8, or 13. If desired a plurality of power take-off shafts may be provided side by side, all of them terminating at the front as well as at the rear of the tractor.

The two rear wheels 4 are freely movable with respect to the front wheels 2 and the central wheels 3 so that the tractor will in general bear on the ground by means of the front wheels 2 and the central wheels 3, whereas the rear wheels 4 will automatically match the conditions of the ground. From FIGS. 3 and 4 it will be seen that the rear wheels are fastened by means of the ball bearings 48, 50 and 49, 51 respectively (which are held by the housing of the driving motors of the wheels) to the upper supporting beam 44 and to the lower supporting beam 45 respectively, these two supporting beams being rigidly secured to the central housing 43, so that apart from the steerability of the wheels 4, this housing 43 with these wheels constitutes a rigid entity. The wheels 4 with their motors, the supporting beams 44 and 45 and the central housing 43 and with the tube 54, the supports 57 and the holders 58 form a wheel carriage. The central housing 43 (FIG. 3) is freely pivotable about the center line of the supporting tube 54 so that the wheels can freely match the ground by their pivotal movement, since one wheel can perform an upward movement and the other wheel simultaneously a downward movement with respect to the frame 1. The direction and the place of the center line of the supporting tube 54 need not change with this freedom of movement with respect to the frame 1. Further degrees of freedom are obtained by the possibility of an upward and downward movement of the wheel carriage with respect to the frame 1 and of a tilting movement about an imaginary, horizontal pivotal axis transverse of the direction of forward travel A with respect to the frame 1, the latter movements being performed simultaneously.

Figure 5:
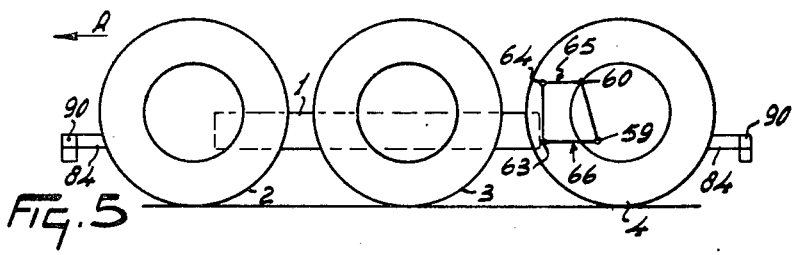
FIGS. 5 to 9 are schematic side views illustrating the ground wheels of the tractor and their suppot structure in various conditions, FIG. 5 showing all wheels standing on a horizontal surface, FIG. 6 showing the rearmost wheels standing on a lower surface than the remaining wheels, FIG. 7 showing the rearmost wheels standing on a higher surface than the remaining wheels, FIG. 8 showing a horizontal surface and the condition in which a comparatively heavy load is carried by the tractor supported rearwardly of the rear wheels, and FIG. 9 again shows a horizontal surface but the condition in which a comparatively very heavy load is carried supported rearwardly of the rear wheels.
Figure 6:
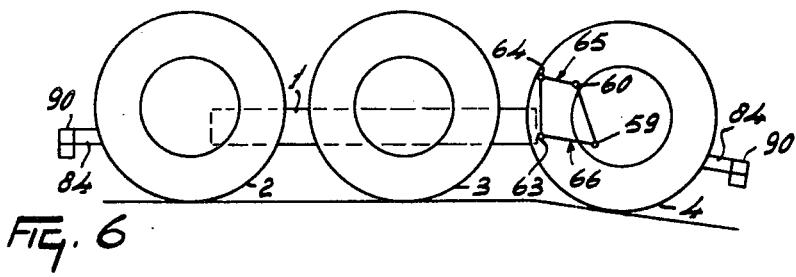
Figure 7:
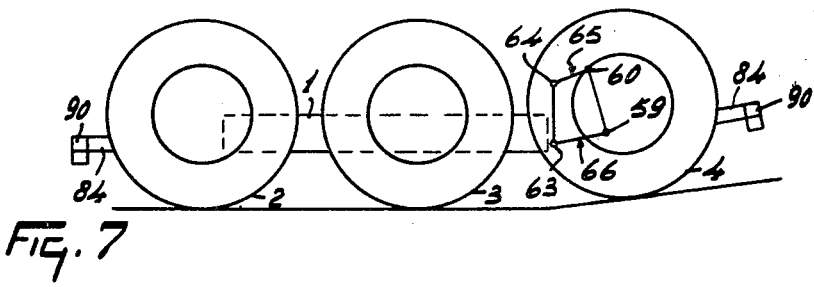

If the tractor is standing on a horizontal surface, the coupling elements 65 and 66 occupy the positions indicated in FIGS. 3 and 5, the center lines of the pins 60 and 64 being located at the same height above the ground as the center lines of the two pins 59 and 63. If the front wheels 2 and the central wheels 3 are standing on a horizontal surface and the rear wheels 4 are on a lower level (see the schematic view of FIG. 6), this is allowed without any difficulty, since the coupling element 65 turns about the center lines of the pins 60 and 64 and the lower coupling element turns about the center lines of the pins 59 and 63. If viewed from the side the center lines of the pins 59, 60, 63 and 64 are at the corners of a parallelogram, the position of the central housing 43 in the disposition shown in FIG. 6 will be the same as that in which all wheels are on the same horizontal surface (FIG. 5). If the distance between the center lines of the pins 60 and 64 is smaller than that between the center lines of the pins 59 and 63, the position of the central housing 43 with respect to the frame 1 will vary so that in the position shown in FIG. 6 the central housing 43 can tilt forwardly in accordance with the dimensions. If the rear wheels are standing on a higer level that the surface of the front wheels 2 and the central wheels 3, a similar upward displacement of the central housing 43 occurs relatively to the frame 1 so that with respect to the original position the central housing 43 can tilt slightly forwards (FIG. 7). In this way a very satisfactory matching of the ground surface is obtained in a vertical direction and when the central housing 43 tilts on the center line of the tube 54.

Figure 8:
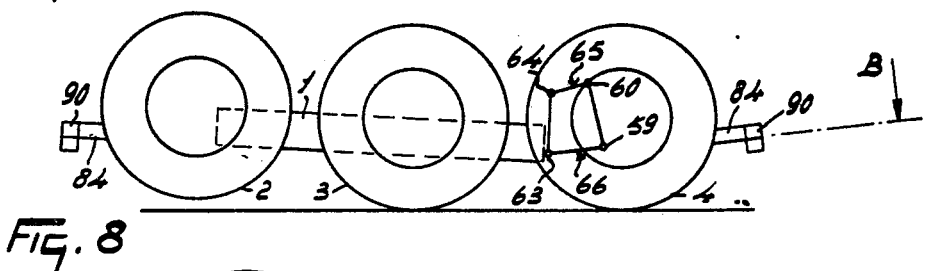

FIG. 8 shows schematically the case in which a comparatively far projecting and a comparatively heavy load is carried behind the rear wheels, for example a loading shovel or a large fertilizer distributor, the load acting as indicated by arrow B. The momentum produced by this load relative to the supporting point of the wheels 4 on the ground will first tend to turn the central housing 43 backwards relatively to the ground, in which the relative positions of the central housing 43 and the frame 1 is such that the position of the central housing 43 has changed so that it is tilted forwards with respect to the frame 1. As compared with the normal position on a flat surface and with the associated position of the central housing 43 the frame 1 will be more inclined upwardly and forwardly, viewed from the rear. If the center of gravity of the assembly (inclusive of the load) is located in front of the ground contact point of the wheels 4, the state of equilibrium will settle itself so that the assembly will tilt forwardly for correcting the first tilting movement (in fact the two tilting movements to be superimposed will take place simultaneously) or the wheels 3 will keep in contact with the ground while the wheels 2 will lift from the ground. Since the wheels 2 are no longer exerting an upward force on the tractor, a larger portion of the tractor will form a counterweight for the load (arrow B) than in the case in which all wheels are in contact with the ground so that the tractor can hold a heavier load than if the whole tractor were a rigid unit. If the load is still heavier (arrow C in FIG. 9), so that the center of gravity of the assembly (inclusive of the load) is located near the ground contact points of the wheels 3, the quadrangle formed by the center lines of the pins 59, 60, 63 and 64, forming pivotal axes, will deform into a triangle, the lines of connection between the points 60 and 64 and between the points 64 and 63 being so to say drawn in line with one another (at least approximately because the weight of the parts in front of the rear wheels 4 will exert a momentum on the structure between the pivotal axes 63 and 64 so that the lines of connection between the pivotal axes 60 and 64, and 64, 63 respectively will be fully in line with one another), the structure between the points 51, 60 and 63 assuming nevertheless the behavior of a triangle. In this case not only the front wheels 2 but even the central wheels 3 may be lifted from the ground so that a still larger part of the weight of the tractor will form a counterweight for the load setting in the direction of the arrow C because the upward forces exerted by the ground on the wheels 2 and 3 are obviated.

The construction of the tractor thus affords not only an excellent matching of the ground but also optimum operational conditions, when very heavy loads are disposed over extreme distances, which may bring about the risk of tilting. It will be appreciated that the construction provided at the rear of the tractor in the forms described above may also, or exclusively, be provided between the front wheels 2 and the central wheels 3, in which case it is desirable to restrict the maximum deformation of the quadrangle on both sides of the tractor by limiting members formed by stops, although also in the form shown such a restriction of the deformation of the quadrangular structure may be advantageous.

Figure 9:
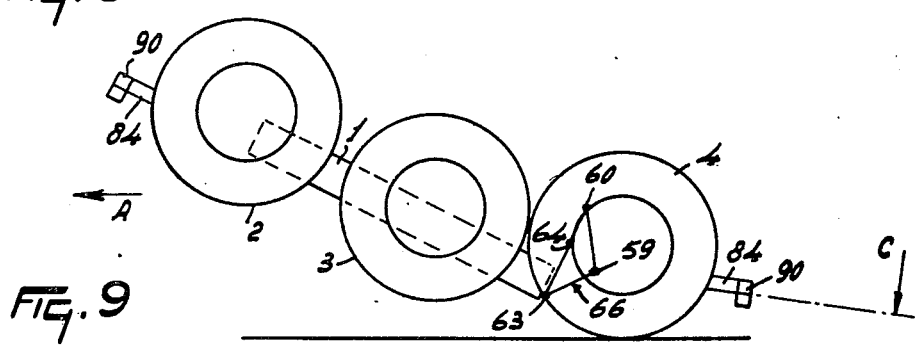

The aforesaid phenomena involved in the use of a quadrangular structure that is of non-parallelogram form also occur when the structure constitutes a parallelogram, but in this case to a reduced extent. In the situation illustrated in FIG. 9 a triangle does not occur, but the parts of the structure between the corners 63, 64 and 59, 60 respectively are in contact with one another so that a stop is necessary. A non-parallelogram-shaped quadrangular structure has the further advantage that when the position shown in FIG. 9 is adjusted, the pivotal axis 64, viewed from the side, will swing to and fro near the line of connection between the pivotal axes 60 and 63 so that this position is attained without shocks.

The lifting device of the tractor can be actuated by energizing the two hydraulic cylinders 81 so that the two arms 78 associated with one cylinder 81 are turned upwardly about their pivotal axis with respect to the ear 74, while the lower lifting arms 84 of the lift are turned upwardly about the pin 82 so that an attached tool is lifted. This attached tool is connected by means of a top bar (not shown) with the ears 75. The lifting beam 90 is coupled with the tractor in a particularly rigid fashion in a lateral direction to counteract what can be frequent lateral swinging movements of the attached tool.

By removing the pin 82 the assembly of the two lower lifting arms 84, the tube 83 and the lifting beam 90 can be removed from the tractor and this assembly can be turned through 180° about a line parallel to and centrally between the center lines of the arms 84 and be remounted by means of the pin 82. It should be noted that the pin 82 can be drawn deeply into the felly of the adjacent wheel so that the tube 83 can be removed with an undivided pin 82. After turning said assembly the bend of the lifting beam 90, originally pointing downwards, will point upwardly. This adaptability permits of providing adequate freedom under any condition for an auxiliary shaft connected with the rearmost portion 13 of the power take-off shaft for driving a tool. When the bend of the lifting beam 90 is pointing downwards, the auxiliary shaft may be inclined upwardly, horizontally or to some extend downwardly away from the power take-off shaft portion 13. If the two lifting arms have been turned and the bend portion of the lifting beam 90 is pointing upwardly, the auxiliary shaft can be guided sharply downwards towards the attached tool. In both positions of the lower lifting arms identical possibilities of attachment are available. In the position inverted with respect to that of FIG. 3 the lower lifting arms can be fastened by means of the fastening tags 86 to the rods 89, in which case the fastening tags 85 are inoperative and extend downwardly. A tool can be coupled in a conventional manner with the pins 92 ridgidly secured to the lifting beam 90 by using the locking unit formed by the bore 97 and a pin passed therethrough, while the tool mounts 94 can be employed when a tool has to be coupled rigidly with the lifting arms 84, for each tool mount 94 a fastening member being passed through the hole 96 whereby with the aid of the pin 92 the tool can be rigidly secured to the lifting arms and, if desired, with the coupling rod (FIGS. 12 and 13).

In the form shown in FIG. 14 the tool-bar 98 can be fastened to the lower arms of the lifting device so as to be rigidly and untiltably coupled with the lifting arms. For this purpose the tool bar 98 fastened to the plate 95 and the sleeve 93 is secured to the lifting beam by sliding the sleeve 93 over one end of the lifting beam, after which the tool bar 98, located between the locking plates 99, is fastened and locked in place by means of the locking pin 100. In this way a series of exchangeable coupling elements is available for coupling tools in different ways.

The form shown in FIG. 16 permits of fastening a tool to a tool bar and in addition rigidly to the lower lifting arms 84 so that it cannot pivot up and down with respect to the lifting arms. The tool is fastened to the two beams 101 by passing a pin through two bores of the tool and two corresponding holes in the two plates 101. Since the tool is then not capable of turning with respect to the two plates 101 and the sleeve 93 is also immovably arranged on the lifting beam 90, the tool in this form is again rigidly secured to the tractor.

The forms of FIGS. 17 and 18 show further exchangeable tool mounts in the form of hook grippers suitable for attaching tools when only in one direction the tool wwill act on the tractor, while for disengagement the tool should be directly removable in a different direction.

Although various features of the vehicles which have been described, and illustrated in the drawings will be set forth in the following claims as inventive features, it is to be noted that the invention is not necessarily limited to these features and is intended to encompass all novel and inobvious features that have been described and illustrated both individually and in various combinations.

Having thus described my invention, what I claim as new and desire to secure by Letters Patent of the United States is:

1. A tractor comprising first and second frame parts supported on wheels, said wheels including three ground engaging wheels positioned one behind the other when the vehicle is seen from the side, an engine mounted on said first frame part, the overall length of said first frame part being substantially greater than that of said second frame part and being supported by two of said ground wheels, said first and second frame parts being interconnected with coupling means, a pivoted quadrangular structure included in said coupling means, said quadrangular structure having two pivotal axes vertically spaced apart on each said frame part, the upper and lower of said pivotal axes being respectively connected by substantially horizontal coupling elements when said wheels are supported on a horizontal surface with the tractor in an unloaded condition whereby said first frame part is adapted to move freely within limits in substantially vertical directions relative to said second frame part adjacent said coupling means, the length of the upper coupling element being smaller than the length of the lower coupling element whereby when said frame parts move relative to each other in substantially vertical directions within the limits of said quadrangular structure they are also tilted relative to each other about further axes which are substantially horizontal and transverse to the longitudinal axis of the tractor, and a lifting means connected to said second frame part at a location opposite to said coupling means relative to a said ground engaging wheel supporting said second frame part.

2. An articulated tractor which comprises:
a forward body;
a rear body;
a pair of wheels mounted on said forward body and a further pair of wheels mounted on said rear body, all of said wheels being in a load-bearing relationship between said bodies and the ground; a pivoted quadrangular structure connecting said bodies, said pivoted structure including two vertically spaced forward pivots mounted on said forward body and two vertically spaced rear pivots mounted on said rear body, the upper pivots in each body being connected by a coupling element of fixed dimensions and the lower pivots in each body being connected by a further coupling element of fixed dimensions substantially longer than said first mentioned coupling element, said upper pivots contained in a substantially horizontal plane and said lower pivots contained in a further substantially horizontal plane when the vehicle is supported on a level surface in an unloaded condition; lifting means mounted on one of said bodies adapted to lift loads which are spaced outwardly from the wheels of said one body and which exert a downward force away from said pivoted quadrangular structure and the other said body, the relationship of said bodies, wheels, pivoted quadrangular structure and lifting means being such that the application of a load on said lifting means is transmitted within structural limitations via said pivoted quadrangular structure to a tilting movement on said other body whereby within limits said other body's pivots are urged downwardly relative to the pivots mounted on said one body.

3. An articulated tractor in accordance with claim 2, wherein the center of gravity of each of said bodies is positioned as seen from the side between vertical planes transverse to the vehicle's longitudinal axis and which are tangent to the most forward aspect and the most rearward aspect of the wheels mounting the body concerned.

4. An articulated tractor in accordance with claim 2, wherein only one pair of wheels is disposed between said lifting device and said coupling means.

5. A tractor comprising:
a pivoted quadrangular structure including first and second frame parts, said quadrangular structure which connects two transverse pivotal axes vertically spaced apart on each said frame part, coupling elements connecting respectively the upper and the lower of said pivotal axes whereby said first frame part is adapted to move freely within limits in substantially vertical directions adjacent said coupling means relative to said second frame part, the sum of the distance between said pivotal axes of said first frame part plus the distance between said pivotal axes connected by one of said coupling elements being substantially different than the sum of the distance between said pivotal axes of said second frame part plus the distance between said pivotal axes connected by the other of said coupling elements;
two wheels positioned one behind the other when the tractor is seen from the side supporting said first frame part and one wheel when the tractor is seen from the side supporting said second said frame part;
a lifting means mounted on said second said frame part at a location opposite the connection of said quadrangular structure with only said one wheel disposed between said lifting means and said quadrangular structure as seen from the side, whereby when said frame parts move relative to each other in substantially vertical directions within the limits of said quadrangular structure, the respective longitudinal axes of said first frame part and second said frame part are tilted relative to each other as seen from the side.

6. A tractor as claimed in claim 5 wherein said tractor has an engine and an articulated power take-off shaft extends from said engine through said frame parts.

7. A tractor in accordance with claim 5, wherein said second frame part includes a housing, turnable means provided on said second frame part for mounting said housing relative to said quadrangular structure whereby said housing is turnable about an axis substantially parallel to the longitudinal axis of said second frame part, said wheel of said second frame part being mounted on said housing and being turnable therewith.

8. A tractor in accordance with claim 5, wherein said quadrangular structure comprises means for performing the function of retaining said frame parts whereby at all times during operation of the tractor said longitudinal axes of said frame parts fall substantially in the same vertical plane.

9. A tractor in accordance with claim 5, wherein the center of gravity of each of said frame parts is positioned, as seen from the side, between vertical planes transverse to the tractor's longitudinal axis and at a tangent to the most forward aspect and the most rear aspect of the wheel or wheels supporting the frame part concerned.

10. A tractor in accordance with claim 5, wherein said coupling means includes means adapted to permit said first frame part to tilt relative to said second frame part further about an axis which is substantially horizontal and parallel to the longitudinal axis of the tractor.

11. A tractor in accordance with claim 5, wherein the distance between the lower of said pivotal axes is substantially greater than the distance between the upper of said pivotal axes.

* * * * *